US010223161B2

(12) United States Patent
Krithivas et al.

(10) Patent No.: US 10,223,161 B2
(45) Date of Patent: Mar. 5, 2019

(54) HARDWARE-BASED INTER-DEVICE RESOURCE SHARING

(71) Applicant: Intel Corporation, Santa Clara, CA (US)

(72) Inventors: Ramamurthy Krithivas, Chandler, AZ (US); Balaji Parthasarathy, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/432,826

(22) Filed: Feb. 14, 2017

(65) Prior Publication Data
US 2017/0161111 A1  Jun. 8, 2017

Related U.S. Application Data

(63) Continuation of application No. 14/659,523, filed on Mar. 16, 2015, now Pat. No. 9,569,267.

(51) Int. Cl.
G06F 3/00 (2006.01)
G06F 13/00 (2006.01)
(Continued)

(52) U.S. Cl.
CPC .............. G06F 9/5011 (2013.01); G06F 1/26 (2013.01); G06F 9/4411 (2013.01);
(Continued)

(58) Field of Classification Search
CPC .................................. G06F 3/00; G06F 13/00
See application file for complete search history.

(56) References Cited

U.S. PATENT DOCUMENTS

| 8,346,935 B2 | 1/2013 | Mayo et al. |
| 2007/0239965 A1 | 10/2007 | Lewites et al. |

(Continued)

FOREIGN PATENT DOCUMENTS

| CN | 101615137 A | 12/2009 |
| EP | 0848327 A2 | 6/1998 |
| EP | 2138935 A1 | 12/2009 |
| JP | 2001-209627 A | 8/2001 |

(Continued)

OTHER PUBLICATIONS

Intel—Jun. 2012, Intel 7 Series/C216 Chipset Family Platform Controller Hub dated—all pages, in particular 130-131.*

(Continued)

Primary Examiner — David E Martinez
(74) Attorney, Agent, or Firm — Grossman, Tucker, Perreault & Pfleger, PLLC

(57) ABSTRACT

The present disclosure is directed to hardware-based inter-device resource sharing. For example, a remote orchestrator (RO) may provide instructions to cause a device to make at least one hardware resource available to other devices. An RO module in the device may interact with the RO and may configure a configuration module in the device based on instructions received from the RO. The configuration module may set a device configuration when the device transitions from a power off state to a power on state. The device may also comprise a processing module to process data based on the device configuration, interface technology (IT) and at least one hardware resource. The interface technology may allow the processing module and the at least one hardware resource to interact. The RO module may configure the IT to allow the at least one hardware resource to operate locally or remotely based on the instructions.

12 Claims, 4 Drawing Sheets

(51) Int. Cl.
  *G06F 9/50* (2006.01)
  *G06F 9/445* (2018.01)
  *G06F 9/4401* (2018.01)
  *G06F 13/12* (2006.01)
  *G06F 1/26* (2006.01)
  *G06F 9/54* (2006.01)

(52) U.S. Cl.
  CPC ........ *G06F 9/4418* (2013.01); *G06F 9/44505* (2013.01); *G06F 9/5072* (2013.01); *G06F 9/5077* (2013.01); *G06F 9/546* (2013.01); *G06F 13/126* (2013.01)

(56) References Cited

U.S. PATENT DOCUMENTS

| | | |
|---|---|---|
| 2009/0327643 A1 | 12/2009 | Goodman et al. |
| 2011/0161551 A1* | 6/2011 | Khosravi ................ G06F 21/80 711/103 |
| 2011/0179134 A1 | 7/2011 | Mayo et al. |
| 2014/0089635 A1 | 3/2014 | Shifer et al. |
| 2014/0330979 A1 | 11/2014 | Jackson |
| 2015/0128053 A1 | 5/2015 | Bragstad et al. |
| 2016/0182395 A1 | 6/2016 | Parikh |

FOREIGN PATENT DOCUMENTS

| | | |
|---|---|---|
| JP | 2006252385 A | 9/2006 |
| JP | 2008-204315 A | 9/2008 |

OTHER PUBLICATIONS

Japanese Office Action issued in Japanese Application No. 2016-000297, dated Mar. 21, 2017, with English machine translation, 7 pages.
Korean Office Action issued in Korean Application No. 2016-0017014, dated Apr. 14, 2017, with English translation, 11 pages.
Office Action issued in U.S. Appl. No. 14/659,523, dated Jun. 29, 2016, 23 pages.
Notice of Allowance issued in U.S. Appl. No. 14/659,523, dated Oct. 17, 2016, 7 pages.
Japanese Office Action issued in Japanese Application No. 2016-000297, dated Nov. 28, 2017, with English machine translation, 5 pages.
European Search Report issued in European Patent Application No. 16153648.7, dated Aug. 11, 2016, 10 pages.
Zhang, et al., "Hardware Assisted Resource Sharing Platform for Personal Cloud", Intel Labs China, Apr. 16, 2010, XP002760715, 5 pages.
Korean Notice of Allowance issued in Korean Patent Application No. 10-2016-0017014, dated Sep. 25, 2017, 3 pages.
Japanese Decision to Grant a Patent issued in Japanese Patent Application No. 2016-000297, dated Feb. 26, 2018, 4 pages.
Chinese Office Action issued in Chinese Patent Application No. 201610087356.2, dated Aug. 28, 2018, 18 pages.

* cited by examiner

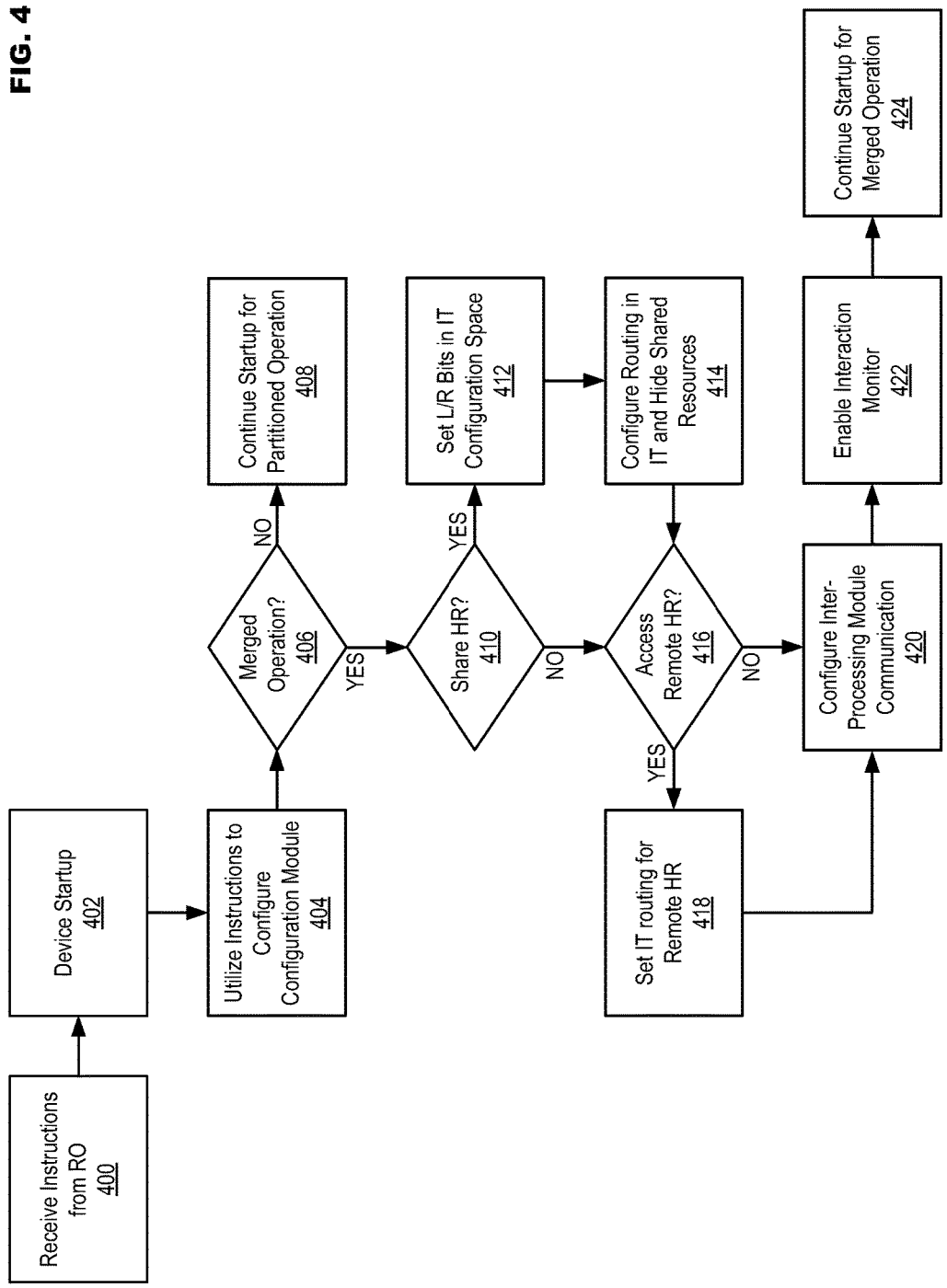

HARDWARE-BASED INTER-DEVICE RESOURCE SHARING

CROSS-REFERENCE TO RELATED APPLICATION

The present application is a continuation of U.S. patent application Ser. No. 14/659,523 filed Mar. 16, 2015, the entire disclosure of which is incorporated herein by reference.

TECHNICAL FIELD

The present disclosure relates to resource allocation, and more particularly, to a device capable of sharing hardware resources with other devices utilizing hardware-based partitioning.

BACKGROUND

The expansion of "cloud-based" data processing solutions, Software-as-a-Service (SaaS), etc. has transferred the bulk of data processing for online interaction away from user devices and into remotely-situated datacenters. An example datacenter may comprise an array of networked data processing devices or "nodes" (e.g., servers) to process data separately or in a collaborative manner (e.g., as in a high performance computing (HPC) architecture). Datacenters may utilize a "software-defined" approach to increase the flexibility of data processing, storage, networking and other hardware resources. For example, software-defined operation may be enabled through software virtualization technologies with assistance from hardware resources. A virtual machine (VM) may emulate physical hardware but is actually a programmatic construct that is executed on a hardware platform under control of a VM manager (VMM) or Hypervisor. Existing software-defined implementations may use, for example, hardware partitioning, virtualization (e.g., VT-x or VT-d technology from the Intel Corporation), Rack-Scale Architecture (RSA), etc.

However, even if a VM allows for the appearance of shared access to hardware resources, processing and input/output (I/O) hardware is still dedicated to a particular node that implements the requested functionality. Existing partitioning and virtualization solutions may only provide very coarse granularity to access and/or control platform level resources. Software virtualization may enable sub-socket-level partitioning. Sub-socket level partitioning may comprise allocating processing resources (e.g., cores) from the same physical package to perform separate tasks. For example, a VMM may create a logical partition for each core in which VMs or an instance of an operating system (OS) may execute. While the benefits of such operation are apparent, software virtualization may also abstract out, and thus make unavailable, valuable hardware functionality. RSA may enable some platform-level resource sharing (e.g., memory may be pooled and shared across multiple nodes), but there is no fine-level partitioning available within the socket. No existing technology allows for sharing processing or I/O hardware resources between nodes or for allocating I/O hardware resources to a pool of available resources wherein multiple nodes can share access. SW virtualization is currently the only option for sub-socket level partitioning of compute and IO resources. No existing architecture can enable pooling sharing, etc. of hardware resources via sub-socket level hardware interface technology (IT) including, for example, Serial Advanced Technology Attachment (SATA), Gigabyte Ethernet (GbE), Serial Attached Small Computer System Interface (SAS), Universal Serial Bus (USB) or any other IT existing now or developed in the future.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 illustrates example operations for hardware-based inter-device resource sharing in accordance with at least one embodiment of the present disclosure.

Figure 1:
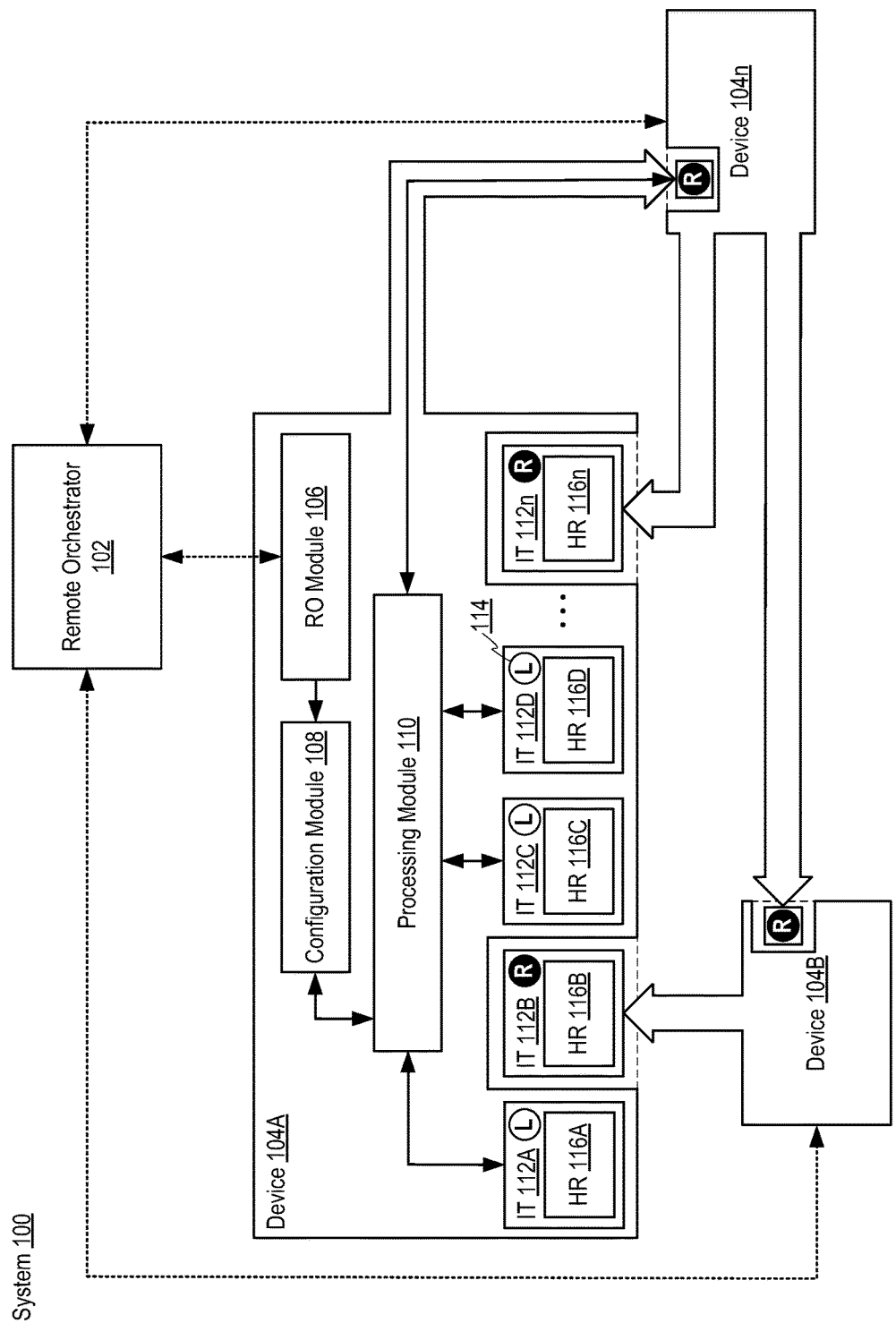
FIG. 1 illustrates an example system for hardware-based inter-device resource sharing in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to hardware-based inter-device resource sharing. In at least one embodiment, a remote orchestrator (RO) may provide instructions to cause a device to make at least one hardware resource available to other devices. For example, an RO module in the device may interact with the RO. The RO module may configure a configuration module in the device based on instructions received from the RO. The configuration module may then set a device configuration (e.g., a "partitioned" configuration or a "merged" configuration) when the device transitions from a power off state to a power on state. The device may further comprise a processing module to process data based on the device configuration, interface technology (IT) and at least one hardware resource. The interface technology may allow the processing module and the at least one hardware resource to interact. The RO module may then configure the IT to allow the at least one hardware resource to operate locally or remotely based on the instructions.

In at least one embodiment, an example device capable of hardware-based inter-device resource sharing may comprise, for example, a configuration module, a processing module, at least one hardware resource, interface technology and an RO module. The configuration module may be to set a device configuration. The processing module may be to process data based on at least the device configuration. The interface technology may be to allow the processing module to interact with the at least one hardware resource. The RO module may be to at least receive at least one instruction from a remote orchestrator, configure the configuration module based on the at least one instruction and configure the interface technology to allow the at least one hardware resource to operate locally or operate remotely based on the at least one instruction.

In at least one embodiment, the configuration module may comprise at least firmware to set the device configuration when the device transitions from an off state to an on state.

In setting the device configuration, the configuration module may be to set the device to operate in a partitioned configuration or a merged configuration. In configuring the interface technology, the RO module may be to set at least one bit in a configuration space of the interface technology to indicate that the at least one hardware resource is to operate locally or operate remotely. For example, the interface technology may be to hide the at least one hardware resource from at least the processing module when the at least one hardware resource is to operate remotely.

In at least one embodiment, the at least one hardware resource may be accessible to at least one other processing module in at least one other device when the at least one hardware resource is to operate remotely. The RO module may be to configure the interface technology to route messages between the at least one hardware resource and the at least one other processing module when the at least one hardware resource is to operate remotely. The RO module may further be to configure the processing module to interact directly with the at least one other processing module based on the device configuration. The configuration module may be to disable coherency protocols between at least one of processor cache or memory for the processing module and the at least one other processing module based on the device configuration.

In at least one embodiment, the device may further comprise an interaction monitor to communicate with the remote orchestrator about interaction between the device and the at least one other device. The interface technology may be, for example, Peripheral Component Interconnect Express (PCIe) interface technology. In at least one example implementation, the device may be in a rack further including the remote orchestrator. Moreover, the rack may further include the at least one other device. Consistent with the present disclosure, an example method for hardware-based inter-device resource sharing may comprise receiving at least one instruction in a device from a remote orchestrator, configuring a device configuration in a configuration module in the device based on the at least one instruction and configuring an interface technology in the device to allow at least one hardware resource in the device to operate locally or operate remotely based on the at least one instruction.

FIG. 1 illustrates an example system for hardware-based inter-device resource sharing in accordance with at least one embodiment of the present disclosure. System 100 may include, for example, RO 102, device 104A, device 104B . . . device 104n (collectively, "devices 104A . . . n"). While only three devices 104A . . . n have been shown in FIG. 1 for the sake of clarity, system 100 actual implementations of system 100 may comprise more or less devices 104A . . . n based on, for example, the size/type of a datacenter including RO 102 and devices 104A . . . n, the use for which system 100 was designed (e.g., HPC, cloud computing installation, SaaS, etc.) or other factors.

RO 102 may comprise at least one computing device (e.g., computer, server, operator station, etc.) configured to "orchestrate" the operation of devices 104A . . . n. Orchestration may include, but is not limited to, determining hardware resources in devices 104A . . . n, determining how the hardware resources in each device 104A . . . n are to be shared, instructing each device 104A . . . n regarding configuration (e.g., hardware resources to share) and managing interaction between devices 104A . . . n. Hardware resources, as referenced herein, may include individual components (e.g., processors, memory, interfaces, etc.), chipsets, multichip modules (MCMs), add-on equipment in the form of modules, cards, plugins, etc. In an example of operation, RO 102 may be tasked with at least one objective such as maximizing data processing efficiency in system 100, eliminating a data processing bottleneck in system 100, accommodating a totally new data processing task in system 100, etc., and in this regard may issue instructions to devices 104A . . . n to reconfigure access to hardware resources, Consistent with the present disclosure, the hardware resources in each device 104A . . . n may be flexibly reassigned down to the sub-socket level without the need for physical reconfiguration or reliance on software partitioning.

An example configuration will now be described for device 104A that is also applicable to devices 104B . . . n. Device 104A may comprise at least RO module 106, configuration module 108, processing module 110, IT 112A, IT 112B, IT 112C, IT 112D . . . 112n (collectively, "IT 112A . . . n") that may correspond to each hardware resource (HR) 116A, HR 116B, HR 116C, HR 116D . . . HR 116n (collectively, "HRs 116A . . . n"). The actual amount of HRs 116A . . . n in device 104A may vary depending on factors such as device type, size, configuration, etc. For example, a device 104A that is a standalone computing device (e.g., having a full tower case) may include better power, capacity, cooling etc. to handle a larger variety and/or amount HRs 116A . . . n (e.g., processors, drives, cards, etc.) than when device 104A is a more compact rack or blade server. In at least one example implementation, RO 102 and/or devices 104A . . . n may all be rack/blade servers in the same installation (e.g., in the same room, in adjacent racks, in the same rack, etc.)

In at least embodiment, RO module 106 may be configured to interact with RO 102. For example, RO module 106 may receive "out-of-band" data including instructions for configuring device 104A. As referenced herein, out-of-band may indicate a manner of communicating that is separate from the manner in which device 104A typically communicates with devices 104B . . . n. For example, a dedicated communication channel may exist between RO 102 and a RO module 106 in each device 104A . . . n. RO module 106 may receive instructions when device 104A is in an off state (e.g., powered off, hibernation, etc.) or in an on state (e.g., active). After receiving instructions, RO module 106 may configure configuration module 108 based on the instructions. Configuration module 108 may comprise, for example, rewritable nonvolatile (NV) memory on which is encoded firmware for setting a mode in device 104A when it becomes active from boot, reboot, waking up from hibernation, etc. In at least one embodiment, configuration module 108 may configure device 104A in either a "partitioned" configuration or a "merged" configuration. A partitioned configuration may be a "typical" configuration wherein device 104A is configured to maintain ownership of all HRs 116A . . . n, and wherein sharing may be possible given existing sharing technologies such as virtualization, RSA, etc. Consistent with the present disclosure, a merged configuration may involve device 104A being reconfigured to share hardware resources at the sub-socket level using hardware-based inter-device resource sharing as described below.

Processing module 110 may comprise at least one data processor along with any circuitry required to support the at least one data processor. Example contents of processing module 110 will be discussed in more detail in FIG. 2. In a merged configuration, processing module 110 may be configured to interact directly with other processing modules 110 in devices 104B . . . n. For the sake of explanation herein, the "IT" in device 104A may comprise both equipment (e.g., sockets, buses, support circuitry, etc.) and software (e.g., drivers, configuration registers, etc.) allowing HR 116A . . . n to interact other resources in device 104A. For example, given that PCIe interface technology is being employed, IT 112A . . . n may be PCIe root ports corresponding to physical sockets in device 104A in which HR 116A . . . n are installed. While PCIe is utilized herein as an example, embodiments consistent with the present disclosure are not limited to being implemented only utilizing PCIe. Consistent with the present disclosure, other ITs having similar operational characteristics may also be employed. In a merged configuration, RO module 106 may configure IT 112A . . . n to allow HR 116A . . . n to operate locally or operate remotely. Device 104A may maintain access and ownership of any HR 116A . . . n that is configured to operate locally, while processing module 110 in other devices (e.g., devices 104B . . . n) may be able to access and control any HR 116A . . . n that is configured to operate remotely. In at least one embodiment, RO module 106 may set bits in a configuration space for IT 112A . . . n to indicate local or remote operation. For example, IT 112A, IT 112C and IT 112D are shown with "L" flag 114 in FIG. 1 to indicate that RO module 106 has set bits in the configuration space to allow HR 116A, HR 116C and HR 116D to operate locally, while IT 112B and IT 112n are shown with "R" flag 114 to indicate that a bit has been set in the configuration space to allow HR 116B and HR 116n to operate remotely. In this manner, sharing for each of HR 116A . . . n may be determined and configured individually.

In an example of operation, RO 102 may at least provide instructions to RO module 106 to configure device 104 for merged operation. RO module 106 may set the merged configuration in configuration module 108, which may proceed to configure device 104A for merged operation upon power up, recovery from hibernation, etc. RO module 106 may also configure IT 112A . . . n for local or remote operation based on the instructions received from RO 102. For example, as shown by flags 114, IT 112A, IT 112C and IT 112D may be configured to allow HR 116A, HR 116C and HR 116D to operate locally, and as a result, HR 116A, HR 116C and HR 116D may be accessible to processing module 110. On the contrary, IT 112B and IT 112n may be configured to allow HR 116B and HR 116n to operate remotely. In at least one embodiment, HR 116B and HR 116n may be hidden from at least processing module 110 during the boot up of device 104A, and thus, would be rendered locally inaccessible. As shown in FIG. 1, at least device 104B may be able to access HR 116B and at least device 104n may be able to access HR 116n. Likewise, device 104A may be able to access HR configured to operate remotely in device 104n, device 104B may be able to access HR configured to operate remotely in device 104B, etc. In at least one embodiment, accessing HR in other devices may be facilitated by a direct link between processing modules 110 operating in each device. An example of interaction between different processing modules 110 will be discussed in regard to the implementation illustrated in FIG. 3.

Figure 2:
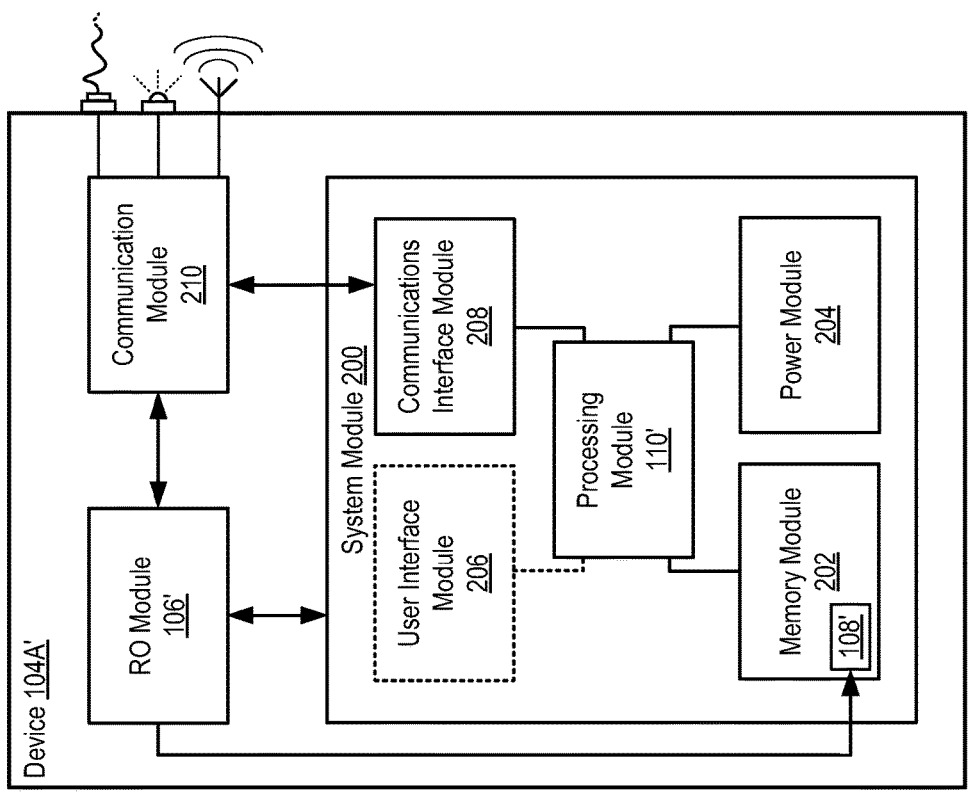
FIG. 2 illustrates an example configuration for a device usable in accordance with at least one embodiment of the present disclosure.

FIG. 2 illustrates an example configuration for a device usable in accordance with at least one embodiment of the present disclosure. The inclusion of an apostrophe after an item number (e.g., 104A') indicates that an example embodiment of the item is being shown. For example, device 104A' may be capable of performing any of the activities disclosed in FIG. 1. However, device 104A' is presented only as an example of an apparatus usable in embodiments consistent with the present disclosure, and is not intended to limit any of the various embodiments to any particular manner of implementation. Moreover, the example configuration for device 104A' illustrated in FIG. 2 may also be applicable to one or more of devices 104B . . . n.

Device 104A' may comprise, for example, system module 200 to manage operation of the device. System module 200 may include, for example, processing module 110', memory module 202, power module 204, user interface module 206 and communication interface module 208. Device 104A' may further include communication module 210 and RO module 106'. While communication module 210 and RO module 106' are illustrated as separate from system module 200, the example configuration shown in FIG. 2 has been provided merely for the sake of explanation. Some or all of the functionality associated with communication module 210 and/or RO module 106' may also be incorporated into system module 200.

In device 104A', processing module 110' may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 110' may interact with other system components that may be operating at different speeds, on different buses, etc. in device 104A'. Some or all of the functionality commonly associated with the support circuitry may also be included in the same physical package as the processor (e.g., such as in the Sandy Bridge family of processors available from the Intel Corporation).

Processing module 110' may be configured to execute various instructions in device 104A'. Instructions may include program code configured to cause processing module 110' to perform activities related to reading data, writing data, processing data, formulating data, converting data, transforming data, etc. Information (e.g., instructions, data, etc.) may be stored in memory module 202. Memory module 202 may comprise random access memory (RAM) and/or read-only memory (ROM) in a fixed or removable format. RAM may include volatile memory configured to hold information during the operation of device 104A' such as, for example, static RAM (SRAM) or Dynamic RAM (DRAM). ROM may include non-volatile (NV) memory modules configured based on BIOS, UEFI, etc. to provide instructions when device 104A' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 204 may include internal power sources (e.g., a battery, fuel cell, etc.) and/or external power sources (e.g., electromechanical or solar generator, power grid, external fuel cell, etc.), and related circuitry configured to supply device 104A' with the power needed to operate. User interface module 206 may include hardware and/or software to allow users to interact with device 104A' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 206 may be incorporated within device 104A' and/or may be coupled to device 104A' via a wired or wireless communication medium. User interface module 206' may be optional in certain circumstances such as, for example, a situation wherein device 104A' is a server (e.g., rack server, blade server, etc.) that does not include user interface module 206, and instead relies on another device (e.g., a management terminal) for user interface functionality.

Communication interface module 208 may be configured to manage packet routing and other control functions for communication module 210, which may include resources configured to support wired and/or wireless communications. In some instances, device 104A' may comprise more than one communication module 210 (e.g., including separate physical interface modules for wired protocols and/or wireless radios) managed by a centralized communication interface module 208. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 208 may be configured to prevent wireless communications that are active in communication module 210 from interfering with each other. In performing this function, communication interface module 208 may schedule activities for communication module 210 based on, for example, the relative priority of messages awaiting transmission. While the embodiment disclosed in FIG. 2 illustrates communication interface module 208 being separate from communication module 210, it may also be possible for the functionality of communication interface module 208 and communication module 210 to be incorporated into the same module.

Consistent with the present disclosure, RO module 106' may interact with at least system module 200, memory module 202 and communication module 210. In an example of operation, RO module 106' may interact with RO 102 via wired and/or wireless communication conducted via communication module 210. After receiving instructions from RO 102 via communication module 210, RO module 106' may configure configuration module 108' in memory module 202. Moreover, RO module 106' may interact generally with IT 112A . . . n in system module 200 (not shown in FIG. 2) to configure IT 112A . . . n to allow HR 116A . . . n to operate locally or remotely, and/or to also allow device 104A' to access remote HR that may be available from other devices.

Figure 3:
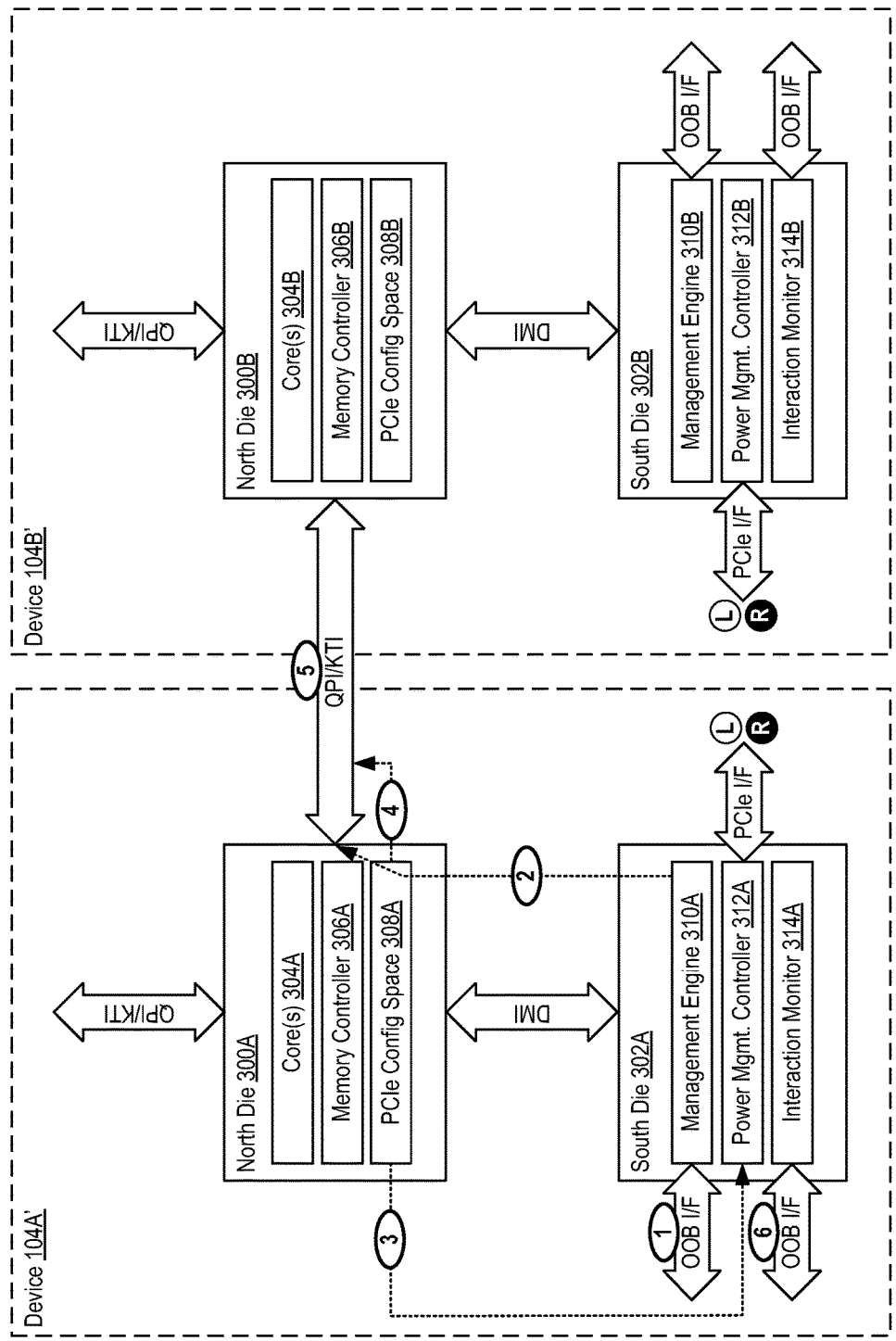
FIG. 3 illustrates an example implementation of hardware-based inter-device resource sharing in accordance with at least one embodiment of the present disclosure.

FIG. 3 illustrates an example implementation of hardware-based inter-device resource sharing in accordance with at least one embodiment of the present disclosure. Example device 104A' and example device 104B' are shown interacting in FIG. 3, the description of which may make reference to various products, technologies, etc. developed by the Intel Corporation. While these references may serve as readily comprehensible examples from which to understand the interaction illustrated in FIG. 3, they are not intended to limit embodiments consistent with the present disclosure to any particular manner of implementation, implementation technology, etc.

Existing computing devices (e.g., servers) may support a "partitioned" configuration wherein a platform containing two nodes can be hard partitioned into two separate platforms. This partition is "hard" because there is no sharing of any HR 116A . . . n between the two one-node platforms. Software virtualization (e.g., via VMs) may provide some sharing ability, but can eliminate the ability to access valuable hardware functionality. PCIe switches may be able to share hardware resources at a fairly granular level, but this solution may increase the total number of discrete components required at a system level. Consistent with the present disclosure, traditional hard partitioning may be enhanced with the pooling and sharing of HR 116A . . . n supported by enabling any node or partition to physically re-assign selected IT 112A . . . n (e.g., PCIe root port hierarchy or PCIe devices) to any other node or partition. In at least one embodiment, partitioning may be limited to coherent domains only, and hardware resources such as PCIe root ports and/or PCIe devices physically implemented in one node or partition may be shared with another node or partition.

In existing partitioning methodology, point-to-point processor connection technologies such as Quickpath Interconnect (QPI) developed by the Intel Corporation, Keizer Technology Interconnect (KTI), an open core connection technology also developed by the Intel Corporation, may be disabled. More specifically QPI/KTI links that allow processors to transmit and receive messages directly between partitioned nodes may not be utilized. However, consistent with the present disclosure, in a pooled resource architecture QPI/KTI links may be employed between nodes or partitions to enable the sharing of HR 116A . . . n. In at least one embodiment, QPI/KTI may be employed without the features for maintaining coherency across partitions.

Example implementations for devices 104A' and 104B' are illustrated in FIG. 3. Device 104A' may comprise, for example, north die 300A and south die 302A. In at least one embodiment, north die 300A may communicate with south die 302A via, for example, Direct Media Interface (DMI) developed by the Intel Corporation. North die 300A (e.g., Northbridge) may include components typically found in a microprocessor component, chipset, MCM, etc. For example, north die 300A may comprise one or more processing cores 304A, memory controller 306A and PCIe configuration space 308A. Memory controller 306A may control data access operations for a memory in device 104A'. PCIe configuration space 308A may control how PCIe root ports (e.g., corresponding to physical PCIe slots in device 104A') and integrated and/or discrete PCIe I/O devices are configured at least in regard to data routing. South die 302A (e.g., Southbridge) may include components typically associated with general I/O functions of device 104A'. South die 302A may also be referred to as a platform controller hub (PCH). For example, south die 302A may comprise management engine (ME) 310A, power management controller (PMC) 312A and interaction monitor 314A. ME 310A may include a standalone processor corresponding to RO module 106 in FIG. 1. For example, ME 310A may be able to receive OOB network communications (e.g., from remote orchestrator 102) even when the rest of device 104A' is inactive. PMC 312A may manage power operations for device 104A' including HR 116A . . . n. In at least one embodiment, interaction monitor 314A may monitor interaction between nodes (e.g., devices 104A' and 104B') and may provide information to RO 102 about these interactions. While not shown in FIG. 3, consistent with the present disclosure south die 302A operating as a PCH may further comprise a SATA controller, USB controller, Ethernet Controller, Serial Peripheral Interface (SPI), Enhanced SPI through a low pin count bus (eSPI/LPC), a universal asynchronous receiver/transmitter (UART) and other communication master/slave interfaces. The corresponding elements 300B to 314B may perform the same or similar operations for device 104B' to that described above in regard to device 104A'.

An example of operations wherein device 104A' may be configured for merged operation with at least device 104B' will now be discussed. While these operations will be presented with regard to device 104A', they are equally as applicable to device 104B'. As shown at "1" in FIG. 3, OOB data including instructions to "partition" to or "merge" may be received at device 104A' For example RO 102 may communicate to ME 310A if device 104A' is to operate independently (e.g., partitioned) in a legacy/non-legacy symmetric multiprocessing (SMP) configuration or in a shared hardware configuration (e.g., merged). This interaction may occur when device 104A' is in the S5 state (e.g., powered off). ME 310A may indicate the mode of operation to BIOS (e.g., configuration module 108) through a status register when device 104A' transitions to S0 (e.g., powered on state). As shown at "2" in FIG. 3, RO 102 may also instruct ME 310A as to which PCIe root ports and/or local integrated/discrete PCIe I/O devices are assigned to a remote node (e.g., device 104B'). RO 102 may also enumerate to which remote node local PCIe IO devices have been reassigned (e.g., and may likewise notify the remote nodes of the remotely operating PCIe IO devices have been assigned to them). In at least one embodiment, ME 310A may set Local/Remote (L/R) bits in a PCIe configuration space 308A for all PCIe Root Ports and for all PCIe integrated/discrete devices.

Following device 104A' transitioning to an on state (e.g., S0) from an off state (e.g., S4 or S5), ME 310A may set integrated I/O (IIO) routing bits to redirect or remap all I/O operations to a specific KTI/QPI link number for each PCIe root port and/or integrated/discrete PCIe device being reassigned to a remote node (e.g., device 104B'). For example, in each node an IIO power control unit (PCU) may determine a path to remote PCIe I/O devices based on a remote node ID (e.g., identifying devices that are sharing the HR 116A . . . n such as device 104B'). The IIO may be modified to route, for example, PCIe config cycles, PCIe vendor defined messages, direct memory access (DMA) and memory-mapped I/O (MMIO) cycles from/to remote nodes based on path. In at least one embodiment, a legacy INTR pin may not be supported to avoid interrupt routing except that message signaled interrupts (e.g., MSI-X extensions) may still be supported. The IIO may bypass transition lookaside buffer (TLB) lookups for remote device transactions.

As shown at "3" in FIG. 3, PMC 312A may hide devices having an "R" configuration in PCIe configuration space 308A. Hiding may include changing the configuration of IT 112A . . . n to cause HR 116A . . . n to be invisible to device 104A'. As a result, local BIOS will not discover or enumerate a PCIe root port or PCIe component/device if it is assigned to a remote node. As shown at "4" in FIG. 3, in each node BIOS shall configure QPI/KTI connections but may disable cache/memory coherency protocols over QPI/KTI between nodes. The exact registers that in IIO that may be programmed may be non-architectural, but may cause BIOS to disable all snooping across nodes, and thus each node may be its own coherency domain. North Die 300A may then begin to interact with at least north die 300B over OPI/KTI links as shown at "5" in FIG. 3. As shown at "6" in FIG. 3, interaction monitor 314A may be used to deal with intra node interactions as a general purpose OOB data messaging engine. In at least one embodiment, the IIO may expand to re-route remote access service (RAS)/error handling, security and power management messages of devices connected to device 104A' via QPI/KTI. Reset sequencing may also be expanded to support pooled/shared resources. While the use of QPI/KTI may leverage existing technology, future connections may be implemented with other existing connection technology, custom connection technology a general industry standard implementation, etc.

FIG. 4 illustrates example operations for hardware-based inter-device resource sharing in accordance with at least one embodiment of the present disclosure. In operation 400 instructions may be received from an RO (e.g., into a RO module in a device). The device may the transition from an off state (e.g., S4 or S5) to an on state (e.g., S0) in operation 402. In operation 404 the instructions received from the RO may be used to configure a configuration module (e.g., BIOS) in the device. A determination may then be made in operation 406 as to whether the device has been instructed to operate in merged configuration. If in operation 406 it is determined that the device should not operate in a merged configuration, then in operation 408 startup of the device may continue for partitioned operation. Following a determination in operation 406 that the device should operate in a merged configuration, a further determination may be made in operation 410 as to whether at least one HR in the device will be shared with at least one other device (e.g., based on the instructions received from the RO). If in operation 410 it is determined that at least one HR in the device will be shared, then in operation 412 local (L) or remote (R) bits may configured in an IT configuration space. Setting the L/R bits may include setting one bit for each HR (e.g., "1" indicates local and "0" indicating remote) or setting different bits for each HR. In operation 414 routing (e.g., PCIe, IIO, MMIO, DMA, error handling, etc.) may be configured for each HR that has been flagged for remote operation, and in addition, each HR operating remotely may be hid so as to prevent them from being recognized as an available HR by the device during boot up.

A "NO" determination in operation 410 or operation 414 may be followed by a further determination in operation 416 as to whether the device should be configured to access remote HR in another device (e.g., based on the instructions received from the RO). If it is determined in operation 416 that at least one remote HR will be accessed, then in operation 418 routing may be set in the device to allow at least a processing module in the device to access the remote HR. A "NO" determination in operation 416 or operation 418 may be followed operation 420 wherein inter-processing module communication may be configured including, for example, configuring QPI/KTI links, disabling cache/memory coherency protocols, configuring interrupt routing, etc. In operation 422 an interaction monitor may be enabled to manage and report on the interaction between nodes. In operation 424 startup may continue in the device for merged operation.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to hardware-based inter-device resource sharing. For example, a remote orchestrator (RO) may provide instructions to cause a device to make at least one hardware resource available to other devices. An RO module in the device may interact with the RO and may configure a configuration module in the device based on instructions received from the RO. The configuration module may set a device configuration when the device transitions from a power off state to a power on state. The device may also comprise a processing module to process data based on the device configuration, interface technology (IT) and at least one hardware resource. The interface technology may allow the processing module and the at least one hardware resource to interact. The RO module may configure the IT to allow the at least one hardware resource to operate locally or remotely based on the instructions.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for device-agnostic power monitoring and profiling.

According to example 1 there is provided a device capable of hardware-based inter-device resource sharing. The device may comprise a configuration module to set a device configuration, a processing module to process data based on at least the device configuration, at least one hardware resource, an interface technology to allow the processing module to interact with the at least one hardware resource and a remote orchestrator module to at least receive at least one instruction from a remote orchestrator, configure the configuration module based on the at least one instruction and configure the interface technology to allow the at least one hardware resource to operate locally or operate remotely based on the at least one instruction.

Example 2 may include the elements of example 1, wherein the configuration module comprises at least firmware to set the device configuration when the device transitions from an off state to an on state. Example 3 may include the elements of example 2, wherein in setting the device configuration the configuration module is to set the device to operate in a partitioned configuration or a merged configuration.

Example 4 may include the elements of any of examples 1 to 3, wherein in configuring the interface technology the remote orchestrator module is to set at least one bit in a configuration space of the interface technology to indicate that the at least one hardware resource is to operate locally or operate remotely.

Example 5 may include the elements of any of examples 1 to 4, wherein the interface technology is to hide the at least one hardware resource from at least the processing module when the at least one hardware resource is to operate remotely.

Example 6 may include the elements of any of examples 1 to 5, wherein the at least one hardware resource is to be accessible to at least one other processing module in at least one other device when the at least one hardware resource is to operate remotely.

Example 7 may include the elements of example 6, wherein the remote orchestrator module is to configure the interface technology to route messages between the at least one hardware resource and the at least one other processing module when the at least one hardware resource is to operate remotely.

Example 8 may include the elements of any of examples 6 to 7, wherein the remote orchestrator module is to configure the processing module to interact directly with the at least one other processing module based on the device configuration.

Example 9 may include the elements of example 8, wherein the processing module and the at least one other processing module interact directly utilizing a Quickpath Interconnect (QPI) connection or a Keizer Technology Interconnect (KTI) connection.

Example 10 may include the elements of any of examples 8 to 9, wherein the configuration module is to disable coherency protocols between at least one of processor cache or memory for the processing module and the at least one other processing module based on the device configuration.

Example 11 may include the elements of any of examples 6 to 10, wherein the remote orchestrator module is to configure the interface technology to route messages between the at least one hardware resource and the at least one other processing module when the at least one hardware resource is to operate remotely and configure the processing module to interact directly with the at least one other processing module based on the device configuration.

Example 12 may include the elements of any of examples 6 to 11, and may further comprise an interaction monitor to communicate with the remote orchestrator about interaction between the device and the at least one other device.

Example 13 may include the elements of any of examples 6 to 12, wherein the device in a rack further including the remote orchestrator.

Example 14 may include the elements of example 13, wherein the rack further includes the at least one other device.

Example 15 may include the elements of any of examples 1 to 14, wherein the interface technology is Peripheral Component Interconnect Express (PCIe) interface technology.

Example 16 may include the elements of any of examples 1 to 15, wherein the remote orchestrator module is to communicate with the remote orchestrator via out-of-band communication.

Example 17 may include the elements of any of examples 1 to 16, wherein the remote orchestrator module is a management engine (ME).

Example 18 may include the elements of any of examples 1 to 17, wherein the configuration module comprises at least firmware to set the device configuration to operate in a partitioned configuration or a merged configuration when the device transitions from an off state to an on state.

According to example 19 there is provided a method for hardware-based inter-device resource sharing. The method may comprise receiving at least one instruction in a device from a remote orchestrator, configuring a device configuration in a configuration module in the device based on the at least one instruction and configuring an interface technology in the device to allow at least one hardware resource in the device to operate locally or operate remotely based on the at least one instruction.

Example 20 may include the elements of example 19, and may further comprise causing the device to transition from an off state to an on state and setting the device to operate in a partitioned configuration or a merged configuration based on the device configuration.

Example 21 may include the elements of any of examples 19 to 20, wherein configuring the interface technology comprises setting at least one bit in a configuration space of the interface technology to indicate that the at least one hardware resource is to operate locally or operate remotely.

Example 22 may include the elements of any of examples 19 to 21, and may further comprise hiding the at least one hardware resource from at least a processing module in the device when the at least one hardware resource is to operate remotely.

Example 23 may include the elements of example 22, and may further comprise configuring the interface technology to route messages between the at least one hardware resource and at least one other processing module in at least one other device when the at least one hardware resource is to operate remotely.

Example 24 may include the elements of example 23, and may further comprise configuring the processing module to interact directly with the at least one other processing module based on the device configuration and disabling coherency protocols between at least one of processor cache or memory for the processing module and the at least one other processing module based on the device configuration.

Example 25 may include the elements of any of examples 23 to 24, and may further comprise communicating with the remote orchestrator about interaction between the device and the at least one other device.

Example 26 may include the elements of any of examples 22 to 25, and may further comprise configuring the interface technology to route messages between the at least one hardware resource and at least one other processing module in at least one other device when the at least one hardware resource is to operate remotely, configuring the processing module to interact directly with the at least one other processing module based on the device configuration and disabling coherency protocols between at least one of processor cache or memory for the processing module and the at least one other processing module based on the device configuration.

According to example 27 there is provided a system including at least one device, the system being arranged to perform the method of any of the above examples 19 to 26.

According to example 28 there is provided a chipset arranged to perform the method of any of the above examples 19 to 26.

According to example 29 there is provided at least one machine readable medium comprising a plurality of instructions that, in response to be being executed on a computing device, cause the computing device to carry out the method according to any of the above examples 19 to 26.

According to example 30 there is provided at least one device configured for hardware-based inter-device resource sharing, the at least one device being arranged to perform the method of any of the above examples 19 to 26.

According to example 31 there is provided a system for hardware-based inter-device resource sharing. The system may comprise means for receiving at least one instruction in a device from a remote orchestrator, means for configuring a device configuration in a configuration module in the device based on the at least one instruction and means for configuring an interface technology in the device to allow at least one hardware resource in the device to operate locally or operate remotely based on the at least one instruction.

Example 32 may include the elements of example 31, and may further comprise means for causing the device to transition from an off state to an on state and means for setting the device to operate in a partitioned configuration or a merged configuration based on the device configuration.

Example 33 may include the elements of any of examples 31 to 32, wherein the means for configuring the interface technology comprise means for setting at least one bit in a configuration space of the interface technology to indicate that the at least one hardware resource is to operate locally or operate remotely.

Example 34 may include the elements of any of examples 31 to 33, and may further comprise means for hiding the at least one hardware resource from at least a processing module in the device when the at least one hardware resource is to operate remotely.

Example 35 may include the elements of example 34, and may further comprise means for configuring the interface technology to route messages between the at least one hardware resource and at least one other processing module in at least one other device when the at least one hardware resource is to operate remotely.

Example 36 may include the elements of example 35, and may further comprise means for configuring the processing module to interact directly with the at least one other processing module based on the device configuration and means for disabling coherency protocols between at least one of processor cache or memory for the processing module and the at least one other processing module based on the device configuration.

Example 37 may include the elements of any of examples 35 to 36, and may further comprise means for communicating with the remote orchestrator about interaction between the device and the at least one other device.

Example 38 may include the elements of any of examples 34 to 37, and may further comprise means for configuring the interface technology to route messages between the at least one hardware resource and at least one other processing module in at least one other device when the at least one hardware resource is to operate remotely, means for configuring the processing module to interact directly with the at least one other processing module based on the device configuration and means for disabling coherency protocols between at least one of processor cache or memory for the processing module and the at least one other processing module based on the device configuration.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device capable of hardware-based inter-device resource sharing, comprising:
    a first processor circuitry;
    a plurality of hardware resources;
    a management engine to:
        receive out of bound (OOB) instructions from a remote orchestrator, the OOB instructions including at least one instruction from a remote device;
        enable a first hardware resource for local or remote operation based on the at least one instruction;
        responsive to the at least one instruction indicating the first hardware resource is to be operated remotely, assign the first hardware resource to the remote device; and
        enable direct communication between the first processor circuitry and second processor circuitry in the remote device;
    interaction monitor circuitry to:
        monitor interactions between the device and the remote device; and
        communicate with the remote orchestrator about the monitored interactions; and
    a power management controller to hide the first hardware resource from the first processor circuitry if the first hardware resource is enabled for remote operation.

2. The device of claim 1, wherein the management engine is to receive the OOB instructions while the device is in an off state.

3. The device of claim 1, wherein the power management controller is further to manage power operations of the plurality of hardware resources.

4. The device of claim 1, further comprising configuration circuitry to manage data routing configurations of a plurality of root ports.

5. A method for hardware-based inter-device resource sharing, comprising:
    receiving, using a management engine, out of bound (OOB) instructions from a remote orchestrator, the OOB instructions including at least one instruction from a remote device;
    enabling, using the management engine, a first hardware resource of a plurality of hardware resources of a device for local or remote operation based on the at least one instruction;
    responsive to the at least one instruction indicating the first hardware resource is to be operated remotely, assigning the first hardware resource to the remote device;
    enabling, using the management engine, direct communication between first processor circuitry and second processor circuitry, the second processor circuitry included in the remote device;
    monitoring, via interaction monitor circuitry, interactions between the device and the remote device;
    communicating, via the interaction monitor circuitry, with the remote orchestrator about the monitored interactions; and
    hiding, using a power management controller, the first hardware resource from the first processor circuitry if the first hardware resource is enabled for remote operation.

6. The method of claim 5, wherein receiving, using the management engine, OOB instructions comprises receiving, using the management engine, OOB instructions while the device is in an off state.

7. The method of claim 5, further comprising managing, using the power management controller, power operations of the plurality of hardware resources.

8. The method of claim 5, further comprising managing, using configuration circuitry, data routing configurations of a plurality of root ports.

9. At least one machine-readable storage device having instructions stored thereon which, when executed by at least one processor, cause the at least one processor to perform operations comprising:
    receive out of bound (OOB) instructions from a remote orchestrator, the OOB instructions including at least one instruction from a remote device;
    enable a first hardware resource of a plurality of hardware resources of a device for local or remote operation based on the at least one instruction;
    responsive to the at least one instruction indicating the first hardware resource is to be operated remotely, assign the first hardware resource to the remote device;
    enable direct communication between first processor circuitry and second processor circuitry, the second processor circuitry included in the remote device;

monitor interactions between the device and the remote device;
communicate with the remote orchestrator about the monitored interactions; and
hide the first hardware resource from the first processor circuitry if the first hardware resource is enabled for remote operation.

10. The at least one machine-readable storage medium of claim 9, wherein the OOB instructions are received while the device is in an off state.

11. The at least one machine-readable storage medium of claim 9, wherein the instructions, when executed by the at least one processor, cause the at least one processor to perform additional operations comprising:
manage power operations of the plurality of hardware resources.

12. The at least one machine-readable storage medium of claim 9, wherein the instructions, when executed by the at least one processor, cause the at least one processor to perform additional operations comprising:
manage data routing configurations of a plurality of root ports.

* * * * *